C. M. SPENCER.
Machines for Turning and Cutting Wire.
No. 137,630. Patented April 8, 1873.
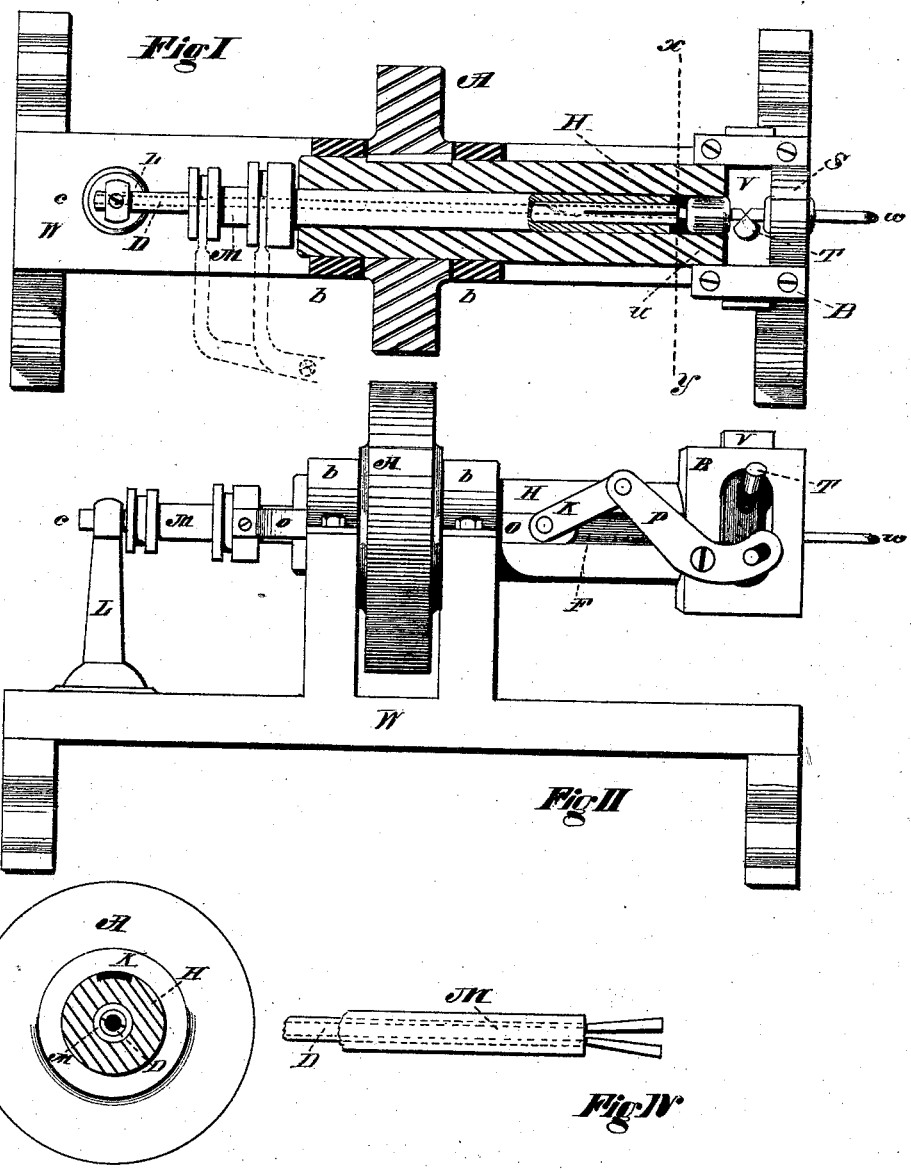

UNITED STATES PATENT OFFICE.

CHRISTOPHER M. SPENCER, OF HARTFORD, CONNECTICUT.

IMPROVEMENT IN MACHINES FOR TURNING AND CUTTING WIRE.

Specification forming part of Letters Patent No. 137,630, dated April 8, 1873; application filed February 14, 1873.

*To all whom it may concern:*

Be it known that I, CHRISTOPHER M. SPENCER, of Hartford, Hartford county, State of Connecticut, have invented a Lathe, of which the following is a specification:

My invention consists in arranging, within a spindle or hub carrying with it a tool in its revolution, a stationary tube having its end nearest the tool formed into a spring-chuck, the jaws of which are compressed and released by a sleeve, and to the operation of the tool from the rear by a slide recessed in or following upon the perimeter of the hub and passing through the driving-pulley; the object of my invention being to enable bobbin-wires, clock pillars, and pinions, and all small articles of the kind requiring to be pointed or otherwise finished on both ends, to be automatically so cut off from the stock and shaped, and to also permit the stock when in the form of wire to be fed from the coil, and, by the arrangement and construction of the devices for advancing and retracting the tool, enable it to be operated from a position upon the lathe convenient, relatively, to the point at which power is applied to the chuck-sleeve, with which it acts conjointly.

In the drawing, Figure I is a partial horizontal section. Fig. II is a side elevation; Fig. III, a partial cross-sectional view on the line $x\,y$, Fig. 1; and Fig. IV, a detail view.

The driving-pulley A is keyed or otherwise fastened to the hub H, which has bearings $b\,b$ from the bed or frame W. The part H carries, upon one end, the tool-carriage B, and has through its axis the tube D, with its chuck end, as shown at Fig. I, at a convenient distance from the carriage B, and its other end fixed in an upright, L, from the bed. Sliding upon the tube D is the sleeve M, which is, at the proper time, moved to compress the jaws of the chuck. The tool T, in its slide V, is moved in the carriage B by the piece O moving in the recess F in the perimeter of hub H, the movement of which upon the hub is diverted to the tool-slide by the toggle K and lever P. The rests S and U are provided with bushings through which the stock $w$ is fed in a line of a prolongation of the tube D.

The operation of the machine is as follows: The wire or rod being fed through the bushings in the head-rests by any of the well-known intermittent feed devices, is, when the desired length has passed the cutting and finishing tool T, grasped and firmly held by the chuck, the revolving tool at the same time being advanced to cut off and finish the piece, the release by the chuck of the work, the withdrawal of the cutter, and the renewed feed-motion being equally nearly simultaneous. The pieces cut off have free passage through the tube D, and are pushed out of its rear end at $c$ by the feed at the other end. The tool-slide V and sleeve M may be operated by cams or by shipping-levers, as indicated in Fig. I, or in other ways. The slide O is brought through the pulley to the rear of the lathe for convenience in operating it in connection with the sleeve M, and to permit the front of the lathe to be kept clear of detached mechanism.

The sleeve M may be splined within the hub, or may move upon the tube D without rotary motion.

Now, having described my invention, what I claim is—

1. The combination of hollow stationary chuck D, reciprocating sleeve M, rotating hub or spindle H, provided with carriage B, with slide O, toggles K P, and the tool T.

2. The combination of hollow stationary chuck D, reciprocating sleeve M, and rotating hub or spindle H, provided with carriage B, slide O, and tool T, with mechanism for reciprocating the said tool, substantially as shown and described.

CHRISTOPHER M. SPENCER.

Witnesses:
R. F. HYDE,
HENRY MORRIS.